(12) United States Patent
Marchesini et al.

(10) Patent No.: US 10,260,638 B2
(45) Date of Patent: Apr. 16, 2019

(54) MULTI-BLADE DOSING VALVE

(71) Applicant: WAMGROUP S.p.A., Modena (IT)

(72) Inventors: Vainer Marchesini, San Prospero (IT); Luca Golinelli, San Possidonio (IT)

(73) Assignee: WAMGROUP S.P.A., Modena (IT)

( * ) Notice: Subject to any disclaimer, the term of this patent is extended or adjusted under 35 U.S.C. 154(b) by 585 days.

(21) Appl. No.: 14/976,715

(22) Filed: Dec. 21, 2015

(65) Prior Publication Data

US 2016/0178068 A1 Jun. 23, 2016

(30) Foreign Application Priority Data

Dec. 22, 2014 (IT) .................................. BO14U0132

(51) Int. Cl.

| | |
|---|---|
| *F16K 1/22* | (2006.01) |
| *B65B 1/08* | (2006.01) |
| *B65B 37/04* | (2006.01) |
| *B65D 90/58* | (2006.01) |
| *F16K 1/16* | (2006.01) |
| *F16K 5/12* | (2006.01) |
| *B65D 88/66* | (2006.01) |
| *F16K 31/44* | (2006.01) |
| *B65D 90/62* | (2006.01) |
| *B65D 90/64* | (2006.01) |
| *B65D 90/66* | (2006.01) |

(52) U.S. Cl.
CPC ................ *F16K 1/223* (2013.01); *B65B 1/08* (2013.01); *B65B 37/04* (2013.01); *B65D 88/66* (2013.01); *B65D 90/582* (2013.01); *B65D 90/585* (2013.01); *B65D 90/623* (2013.01); *B65D 90/64* (2013.01); *B65D 90/66* (2013.01); *F16K 1/165* (2013.01); *F16K 1/22* (2013.01); *F16K 5/12* (2013.01); *F16K 31/44* (2013.01); *Y10T 137/87523* (2015.04); *Y10T 137/87531* (2015.04)

(58) Field of Classification Search
CPC . F16K 5/12; F16K 1/223; F16K 1/165; Y10T 137/87523; Y10T 137/87531; B65B 1/08; B65B 37/04; B65D 88/66; B65D 90/582; B65D 90/623; B65D 90/585
See application file for complete search history.

(56) References Cited

U.S. PATENT DOCUMENTS

| | | | |
|---|---|---|---|
| 3,784,061 A | 1/1974 | Hogan | |
| 6,059,149 A * | 5/2000 | Kanzler | B65B 1/08 |
| | | | 141/313 |
| 2011/0240671 A1* | 10/2011 | McDiarmid | B65D 88/665 |
| | | | 222/1 |

* cited by examiner

*Primary Examiner* — Atif H Chaudry
(74) *Attorney, Agent, or Firm* — Leason Ellis LLP

(57) ABSTRACT

A multi-blade dosing valve comprising the following elements:
a valve body provided with a central opening;
a plurality of shafts, each provided with a respective blade, which extend transversely to the central opening; the blades being able to close, at least partially, the central opening;
a motor unit which causes the opening/closing of the blades; and
vibrators to set in vibration the shafts and the blades. The multi-blade dosing valve comprises an independent vibrator for each shaft.

13 Claims, 5 Drawing Sheets

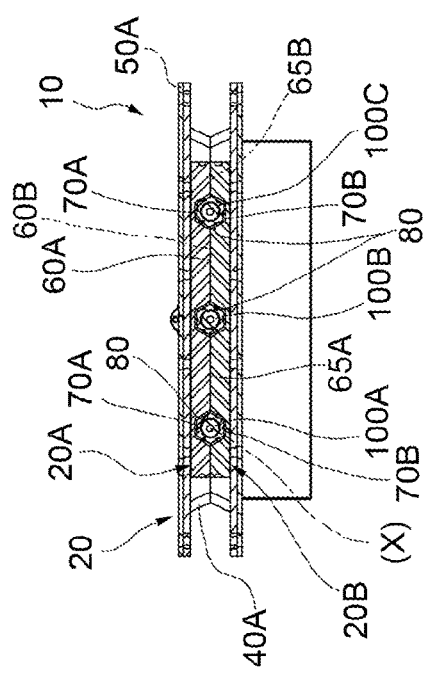
FIG.3
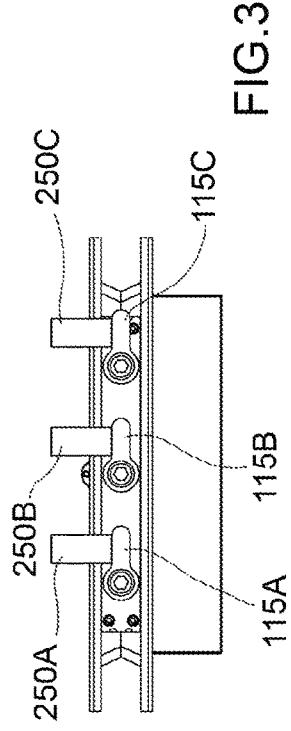
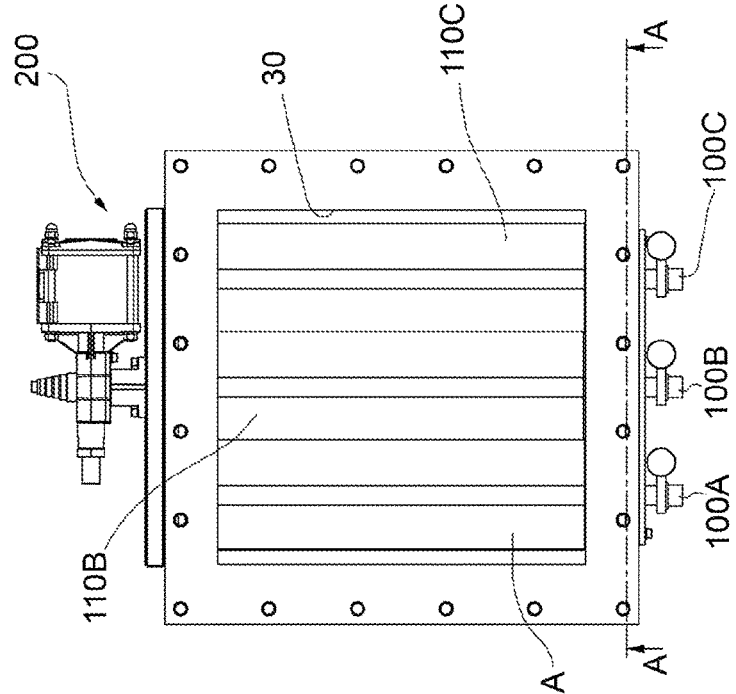
FIG.4
FIG.2

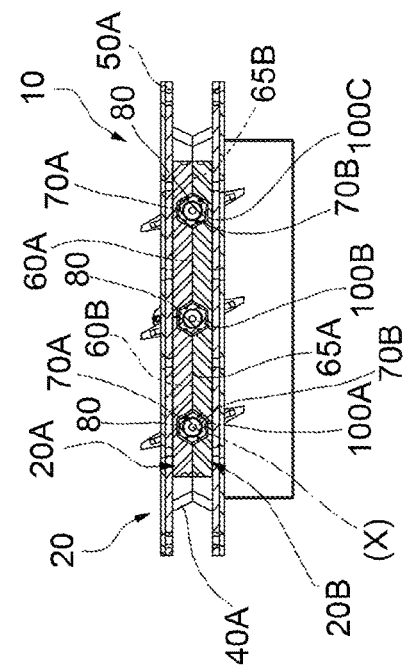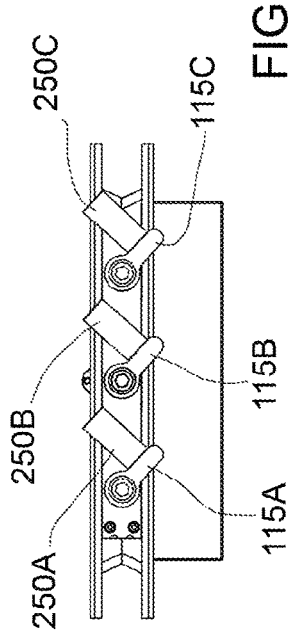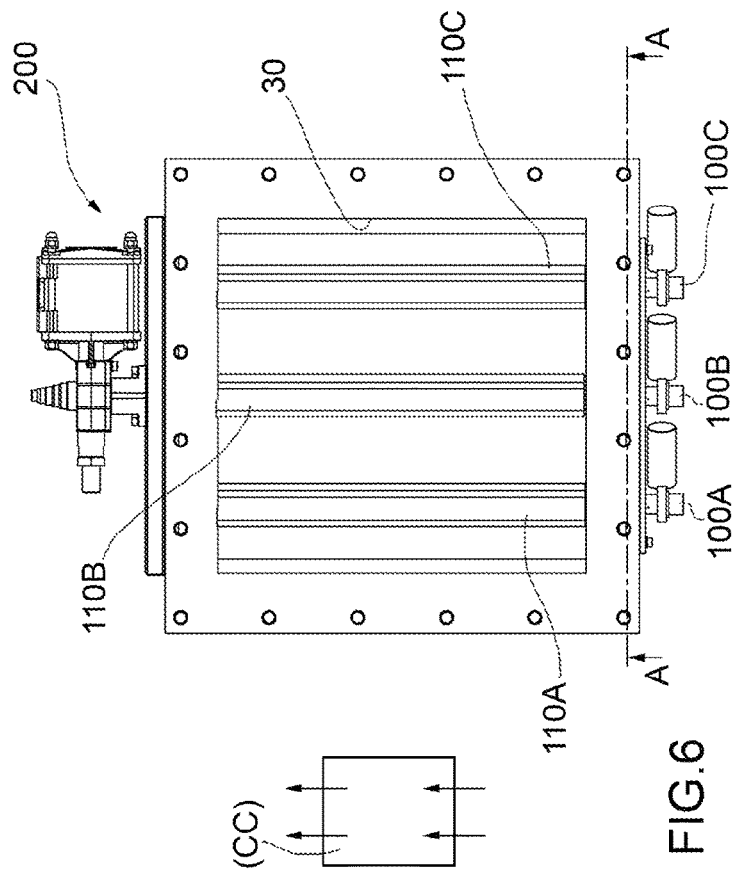

MULTI-BLADE DOSING VALVE

CROSS-REFERENCE TO RELATED PATENT APPLICATIONS

The present application claims the benefit of priority under 35 U.S.C. § 119 of Italian patent application serial No. BO2014U000132, filed Dec. 22, 2014, which is hereby incorporated by reference in its entirety.

The present invention relates to a multi-blade dosing valve.

The invention relates more particularly, but not exclusively, to a multi-blade dosing valve to be used in an apparatus for the periodic discharge of a granular or pulverulent material from a storage tank, for example a silo.

BACKGROUND OF THE INVENTION

Multi-blade dosing valves, like the one described for example in U.S. Pat. No. 3,784,061, are already known.

The multi-blade dosing valve described in U.S. Pat. No. 3,784,061 comprises the following elements:
a valve body provided with a central opening crossed, in actual use, by the pulverulent or granular material, which is discharged from a hopper into a distribution duct;
a plurality of shafts, each provided with a respective blade which extends transversely to said central opening;
a motor unit, which, by rotating the plurality of shafts, causes the opening/closing of said blades to adjust the amount of material discharged from the hopper; and
a vibrator device, which can set in vibration both said valve body and said shafts provided with blades.

One of the main drawbacks of such a multi-blade dosing valve is that the energy of the vibrator device is dispersed in the valve body and does not conveniently reach the blades. This involves the formation of bridges of pulverulent material in the gaps between the blades and a lower efficiency and precision in the dosage of the material.

Furthermore, setting in vibration the entire valve body implies a remarkable noise level of the apparatus, with a consequent acoustic pollution of the work environment.

SUMMARY OF THE INVENTION

Therefore, the main object of the present invention is to provide a multi-blade dosing valve which is free from the aforesaid drawbacks and, at the same time, is simple and economical to produce.

Therefore, the present invention provides a multi-blade dosing valve according to claim 1, and preferably, any one of the claims directly or indirectly depending on claim 1.

First object of the present invention is a multi-blade dosing valve comprising the following elements:
a valve body provided with a central opening;
a plurality of shafts, each provided with a respective blade which extend transversely to the central opening; the blades being able to close, at least partially, the central opening;
a motor unit which causes the opening/closing of the blades; and
vibrators to set in vibration shafts and blades;
the multi-blade dosing valve being characterized in that it comprises an independent vibrator for each shaft.

In addition, the multi-blade dosing valve is provided with a vibration damping bushing on each shaft.

BRIEF DESCRIPTION OF THE DRAWINGS

For a better understanding of the present invention, it will be now described a preferred embodiment, purely as a non-limiting example and with reference to the accompanying drawings, wherein:

FIG. 2 shows a plan of the multi-blade dosing valve in its first closed configuration of FIG. 1;

FIG. 3 shows a side view of the multi-blade dosing valve in its first closed configuration of FIG. 1;

FIG. 4 shows a cross section A-A on the plan of FIG. 2;

FIG. 6 shows a plan of the multi-blade dosing valve in its second open configuration of FIG. 5;

FIG. 7 shows a side view of the multi-blade dosing valve in its second open configuration of FIG. 1;

FIG. 8 shows a cross section A-A on the plan of FIG. 6; and

Figure 1:
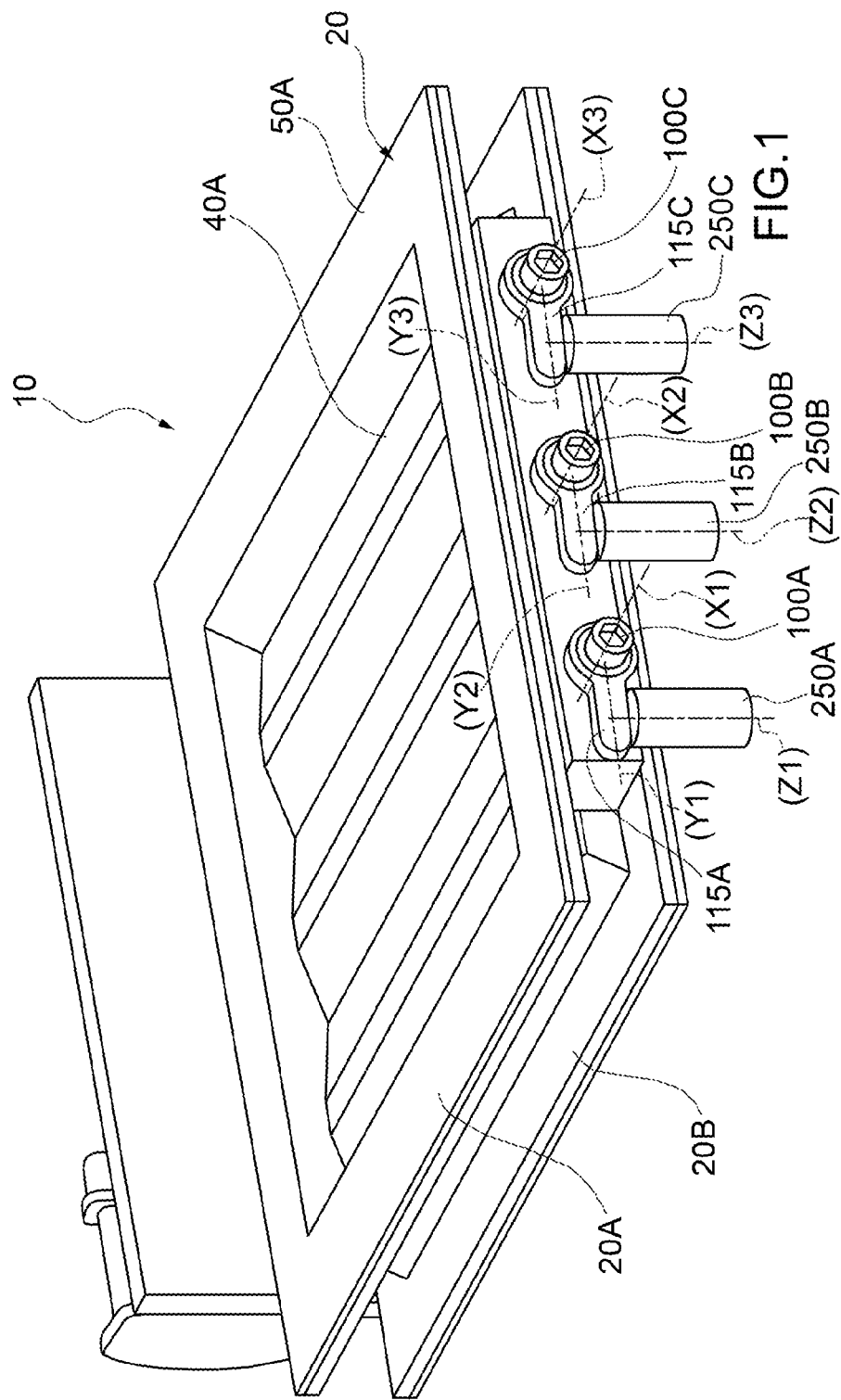
FIG. 1 shows an axonometric view of a first closed configuration of a multi-blade dosing valve according to the teaching of the present invention.
Figure 5:
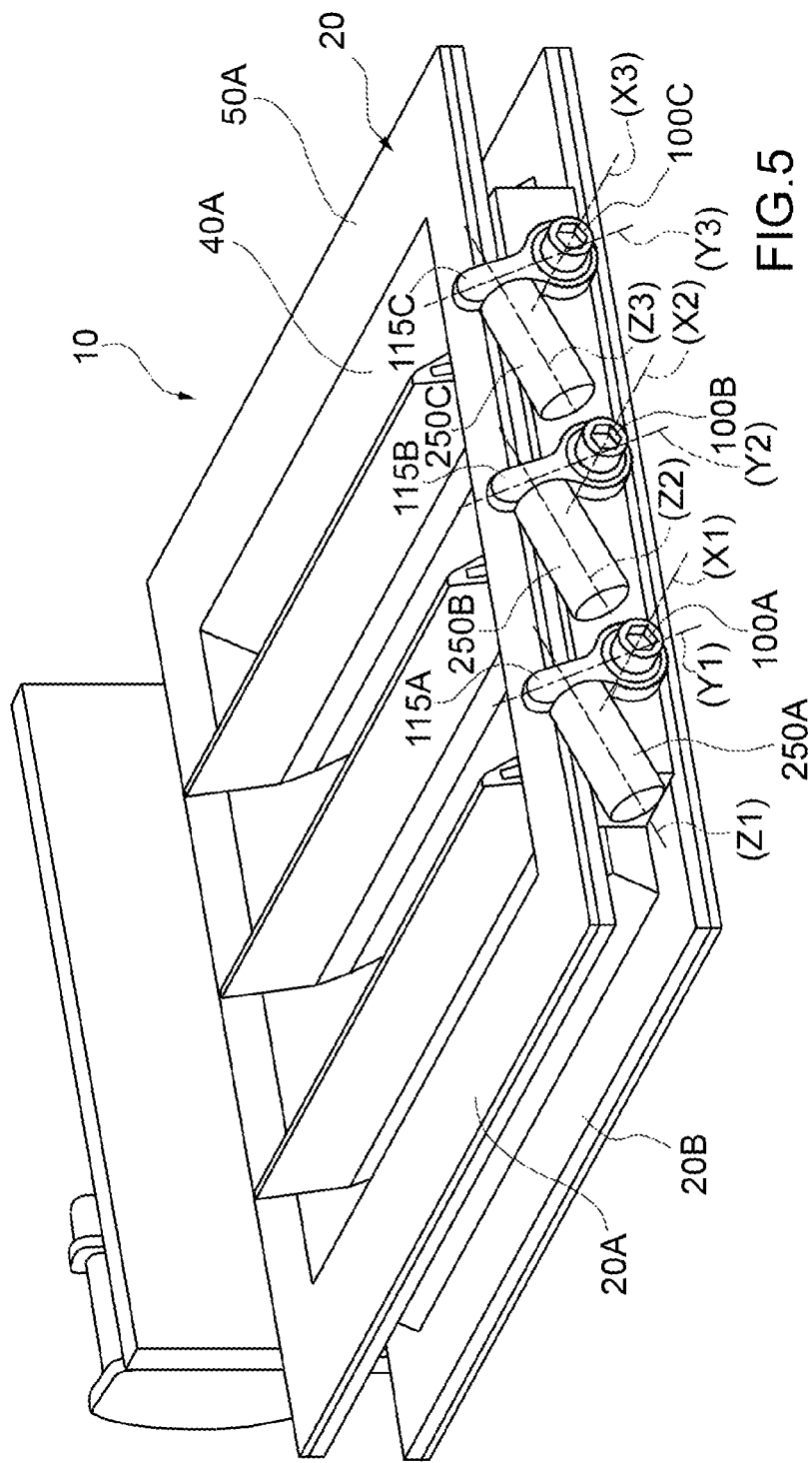
FIG. 5 shows an axonometric view of a second open configuration of a multi-blade dosing valve according to the teaching of the present invention.

In the attached figures, 10 indicates, as a whole, a multi-blade dosing valve according to the teaching of the present invention.

DETAILED DESCRIPTION OF THE INVENTION

The dosing valve 10 comprises a substantially square valve body 20 provided with a substantially square central opening 30 crossed, in actual use, by the pulverulent or granular material which is discharged from a hopper (not shown) into a distribution duct (not shown).

As shown in greater detail in FIG. 4, the valve body 20 can consist of substantially equal upper half-shell 20A and lower half-shell 20B.

With regard, for example, to the upper half-shell 20A (but the same can be said for the other half-shell 20B), it comprises a relative truncated pyramidal part 40A which is connected to a respective flange 50A, which looks like a horizontal frame of the truncated pyramidal part 40A. In the upper half-shell 20A, the truncated pyramidal part 40A protrudes downwards so that the truncated pyramidal part 40A decreases from the top downwards.

In the preferred embodiment shown in the attached Figures, nr. 6 openings 70A (3 for each edge) are formed on two opposite and parallel edges 60A, 60B of the truncated pyramidal part 40A. The perimeter of each opening 70A is formed by a broken line comprising three sides.

Similarly, in the lower valve 20B, the truncated pyramidal part 40B protrudes upwards so that the truncated pyramidal part 40B decreases from the bottom upwards.

Analogously to the upper half-shell 20A, nr. 6 openings 70B (3 for each edge) are formed on two opposite and parallel edges 65A, 65B of the truncated pyramidal part 40B. The perimeter of each opening 70B is formed by a broken line comprising three sides for reasons that will be explained later.

In actual use, the smaller bases of the truncated pyramidal parts 40A, 40B are pressed on each other.

Since, as already stated, the two truncated pyramidal parts 40A, 40B are identical, each opening 70A belonging to the truncated pyramidal part 40A coincides with a corresponding opening 70B of the truncated pyramidal part 40B. Each pair of openings 40A, 40B constitutes a hexagonal seat 80 housing a relative hexagonal bushing 90 shown in more detail in FIG. 9 and in the relative magnification.

For the person skilled in the art it is obvious that the hexagonal seat 80 is equivalent to any seat having any polygonal shape able to prevent a rotation of the bushing.

Moreover, at least in part, the polygon sides can be curved, and not rectilinear.

Figure 9:
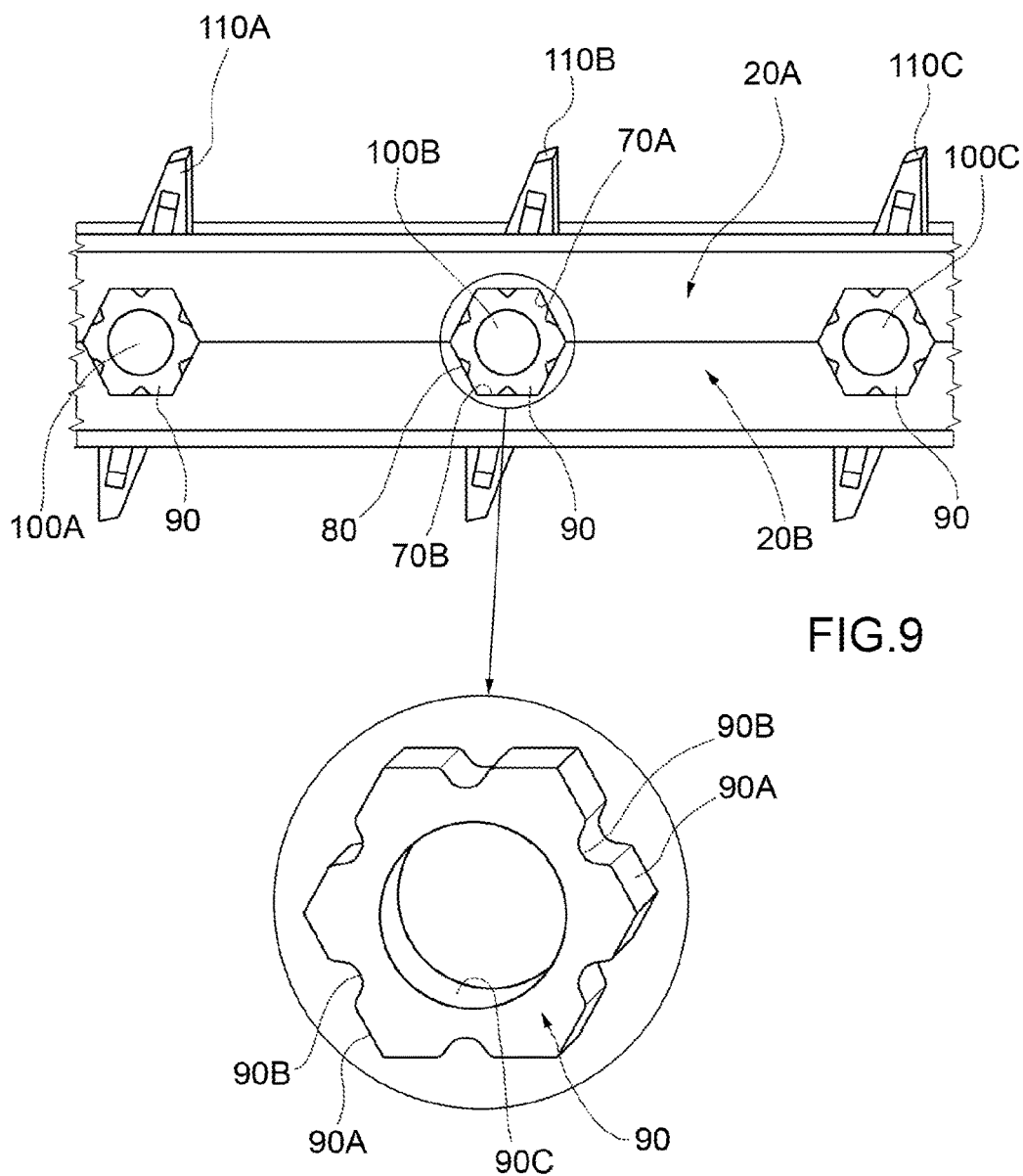
FIG. 9 (with an enlarged element) illustrates a portion of the multi-blade dosing valve according to the invention.

As shown in FIG. 9, the hexagonal bushing 90, made preferably, but not exclusively, of polyurethane, has six peripheral sides 90A, each of which is provided with a corresponding discharge notch 90B. In the hexagonal bushing 90 it is further provided a circular central through hole 90C to house a respective shaft 100A, 100B, 100C on which a respective blade 110A, 110B, 110C (FIGS. 1, 2, 5, 7) is mounted.

Thanks to known and not shown systems, each shaft 100A, 100B, 100C is set in rotation around a respective longitudinal axis (X1), (X2), (X3) by means of a single motor unit 200 which transmits the motion to a rack, or to a system of levers. The rotation of the shafts 100A, 100B, 100C also rotates the blades 110A, 110B, 110C, thus allowing to pass from the closed configuration of FIG. 1 to the (at least partially) open configuration shown in FIG. 5.

Obviously, the degree of opening of the blades 110A, 110B, 110C depends on the angle of rotation of each shaft 100A, 100B, 100C around its own axis (X).

Each degree of opening of each blade 110A, 110B, 110C may be equal to or different from the one of the other two blades. This is because each blade 110A, 110B, 110C may also have a rotation system independent of the rotation systems of the other two blades.

As shown in more detail in FIGS. 3, 7, a respective arm 115A, 115B, 115C (having a respective longitudinal axis (Y1), (Y2), (Y3)) which extends perpendicularly to the axis (X1), (X2), (X3) protrudes from each shaft 100A, 100B, 100C.

One of the characteristics of the present invention is that a respective vibrator 250A, 250B, 250C is mounted on each arm 115A, 115B, 115C.

Furthermore, each hexagonal bushing 90 is a damping device designed to avoid, insofar as possible, the transmission of the vibrations generated by the vibrators 250A, 250B, 250C also to the valve body 20.

Thanks to this arrangement, most of the vibration energy is conveyed towards the organs which mostly need it, namely the shafts 100A, 100B, 100C and the respective blades 110A, 110B, 110C, avoiding, insofar as possible, a dissipation of the vibration energy on the valve body 20.

In a further embodiment of the present invention, not shown, the blades are asymmetrical relative to the respective axis (X1), (X2), (X3), rather than symmetrical, as shown in the embodiment in the attached FIGS. 1-9.

In another embodiment, not shown, the blades can have respectively different initial inclinations.

Each vibrator 250A, 250B, 250C is independent from the other two, and therefore it can be programmed to vibrate (or not to vibrate at all) with frequencies and intensities possibly different from those of the other shafts 100A, 100B, 100C and blades 110A, 110B, 110C. This means that thanks to the teaching of the present invention it is possible to adjust and program the vibration characteristics of each shaft 100A, 100B, 100C (and thus of each blade 110A, 110B, 110C) depending on the discharge parameters of the pulverulent (or granular) product from the hopper.

For example, the performance of the dosing valve can be possibly optimized by increasing the frequency of the external vibrators 250A, 250C with respect to the one of the central vibrator 250B (FIG. 3).

Although the attached figures show embodiments wherein each vibrator 250A, 250B, 250C is mounted on a respective arm 115A, 115B, 115C, it is possible to imagine an embodiment (not shown) wherein each vibrator 250A, 250B, 250C is mounted on the respective shaft 100A, 100B, 100C, directly or through a suitable bushing (not shown) fitted on the shaft 100A, 100B, 100C.

Furthermore, although in the attached figures the axes (X1), (X2), (X3); (Y1), (Y2), (Y3); (Z1), (Z2), (Z3) are all mutually perpendicular, in other embodiments not shown these axes (X1), (X2), (X3); (Y1), (Y2), (Y3); (Z1), (Z2), (Z3) are mutually inclined at angles suitably selected by the user according to the wished vibrating effect on each shaft 100A, 100B, 100C.

Such respective inclinations can be suitably chosen on any plane that contains at the same time a pair of axes (X1), (X2), (X3); (Y1), (Y2), (Y3); (Z1), (Z2), (Z3).

In other words, in an embodiment not shown, each axis (Z1), (Z2), (Z3) of each vibrator 250A, 250B, 250C may be inclined with respect to the corresponding axis (Y1), (Y2), (Y3) at a suitable angle on any plane (not shown) that contains at the same time the pairs of axes (Y1), (Z1); (Y2), (Z2); (Y3), (Z3).

The angles of inclination between the pairs may be equal or different.

At most, at least one angle between the pairs of axes (X1), (X2), (X3); (Y1), (Y2), (Y3); (Z1), (Z2), (Z3) may be equal to zero.

In this case, the axis (Z1), (Z2), (Z3) of the vibrator 250A, 250B, 250C coincides with the axis (Y1), (Y2), (Y3) of the respective arm 115A, 115B, 115C, or coincides with the axis (Y1), (Y2), (Y3) of the respective shaft 100A, 100B, 100C.

The same comments also apply when each vibrator 250A, 250B, 250C is mounted on the respective shaft 100A, 100B, 100C.

In this latter case, then, the relevant elements are the pairs of axes (X1), (Z1); (X2), (Z2); (X3), (Z3), since the arms 115A, 115B, 115C no longer exist.

The dosing valve of the invention can also be provided with known and not shown means which allow the buyer to finely adjust the angles of inclination between the different axes (X1), (X2), (X3); (Y1), (Y2), (Y3); (Z1), (Z2), (Z3) in order to adjust, from time to time, the dosing valve to the chemical/physical characteristics of the material to be discharged through the valve.

The main advantages of the aforesaid multi-blade dosing valve consist in preventing the formation of bridges of material and in drastically reducing its noise level.

In addition, it allows a more precise dosage of the amount of material coming out of the valve with a reduced dissipation of energy that, thanks to the presence of the damping means, is used to set in vibration the parts of the dosing valve (shafts and blades) necessary to induce the descent of the material, thus avoiding to dissipate energy to set in vibration the valve body.

The invention claimed is:

1. A multi-blade dosing valve comprising the following elements:
 a valve body provided with a central opening crossed, in actual use, by the pulverulent or granular material which is discharged from a hopper into a distribution duct;

a plurality of shafts, each provided with a respective blade, which extend transversely to said central opening; said blades being able to close, at least partially, said central opening;

an actuating system, which, by rotating said plurality of shafts, causes the opening/closing of said blades; and a vibrator device to set in vibration said shafts and said blades;

multi-blade dosing valve characterized in that it comprises an independent vibrator device for each shaft; and vibration damping means, said damping means being associated with each shaft.

2. Multi-blade dosing valve, according to claim 1, wherein each independent vibrator device is programmed to vibrate with frequencies and intensities possibly different from those of the other shafts and blades.

3. Multi-blade dosing valve, according to claim 1, wherein said damping means have a central through hole to house a corresponding shaft.

4. Multi-blade dosing valve, according to claim 1, wherein a respective arm, on which a respective vibrator device is mounted, is associated with each shaft.

5. Multi-blade dosing valve, according to claim 1, further comprising substantially equal upper half-shell and lower half-shell; each half-shell comprising a respective truncated pyramidal part to which respective connecting means are fixed.

6. Multi-blade dosing valve, according to claim 1, wherein the degree of opening of a blade is equal to the degree of opening of at least another blade.

7. Multi-blade dosing valve, according to claim 1, wherein the degree of opening of a blade is different from the degree of opening of at least another blade.

8. A multi-blade dosing valve comprising the following elements:

a valve body provided with a central opening crossed, in actual use, by the pulverulent or granular material which is discharged from a hopper into a distribution duct;

a plurality of shafts each provided with a respective blade, which extend transversely to said central opening; said blades being able to close, at least partially, said central opening;

an actuating system which, by rotating said plurality of shafts, causes the opening/closing of said blades;

a vibrator device to set in vibration said shafts and said blades;

multi-blade dosing valve characterized in that it comprises an independent vibrator device for each shaft; and substantially equal upper half-shell and lower half-shell; each half-shell comprising a respective truncated pyramidal part to which respective connecting means are fixed;

wherein a respective plurality of openings is arranged on two respective opposite and parallel edges of the truncated pyramidal parts; the perimeter of each opening being formed by a broken line having at least some curved sides.

9. Multi-blade dosing valve, according to claim 8, wherein, in actual use, the smaller bases of the two truncated pyramidal parts are pressed on each other so that each pair of openings constitutes a seat housing respective vibration damping means; said seat being substantially polyhedral.

10. Multi-blade dosing valve, according to claim 9, wherein said damping means associated with each shaft comprise a substantially polygonal bushing wherein at least a part of the sides is provided with a corresponding exhaust notch.

11. A multi-blade dosing valve comprising the following elements:

a valve body provided with a central opening crossed, in actual use, by the pulverulent or granular material which is discharged from a hopper into a distribution duct;

a plurality of shafts, each provided with a respective blade, which extend transversely to said central opening; said blades being able to close, at least partially, said central opening;

an actuating system, which, by rotating said plurality of shafts, causes the opening/closing of said blades; and a vibrator device to set in vibration said shafts and said blades;

multi-blade dosing valve characterized in that it comprises an independent vibrator device for each shaft;

wherein the axes (X1), (X2), (X3) of the shafts are mutually inclined at angles suitably selected according to the wished vibrating effect on each shaft.

12. Multi-blade dosing valve, according to claim 11, wherein it further comprising means allowing to finely adjust the angles of inclination between the different axes (X1), (X2), (X3), in order to adjust, from time to time, the dosing valve to the chemical/physical characteristics of the material to be discharged through the valve.

13. Multi-blade dosing value according to claim 11, wherein axes (Y1), (Y2), (Y3) of arms; and optionally axes (Z1), (Z2), (Z3) of the vibrator devices, are mutually inclined at angles suitably selected according to the wished vibrating effect on each shaft.

* * * * *